(12) United States Patent
Stademann

(10) Patent No.: US 6,389,128 B1
(45) Date of Patent: May 14, 2002

(54) ROUTING METHOD

(75) Inventor: Rainer Stademann, Egmating (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,738

(22) PCT Filed: Nov. 10, 1997

(86) PCT No.: PCT/EP97/06245

§ 371 Date: May 24, 1999

§ 102(e) Date: May 24, 1999

(87) PCT Pub. No.: WO98/25419

PCT Pub. Date: Jun. 11, 1998

(30) Foreign Application Priority Data

Dec. 4, 1996 (DE) ......................................... 961 19 489

(51) Int. Cl.⁷ ................................................ H04M 7/00
(52) U.S. Cl. ............................. 379/221.01; 379/112.01; 379/112.04; 379/112.05
(58) Field of Search ............................. 379/111, 112.01, 379/112.05, 220.01, 221.01, 221.02, 221.06, 112.03, 112.04, 112.08, 221.07

(56) References Cited

U.S. PATENT DOCUMENTS

| | | | | |
|---|---|---|---|---|
| 4,345,116 A | * | 8/1982 | Ash et al. ............... | 379/221.01 |
| 4,669,113 A | * | 5/1987 | Ash et al. ............... | 379/221.01 |
| 5,068,892 A | * | 11/1991 | Livanos ................. | 379/112.01 |
| 5,086,460 A | | 2/1992 | Ash et al. | |

FOREIGN PATENT DOCUMENTS

| | | |
|---|---|---|
| DE | 43 22 563 A1 | 1/1995 |
| DE | 44 28 349 A1 | 2/1996 |
| WO | WO 96/11551 | 4/1996 |

OTHER PUBLICATIONS

Chemouil, P. et al, Performance Issues in the Design of Dynamically Controlled Circuit–Switched Networks, IEEE Communications Magazine, vol. 28, No. 10, Oct. 1990, pp. 90–95.

Chen, M.H. et al, International Network Management Data Exchange: Benefit Assessment by Stimulation, IEEE Global Telecommunications Conference, Nov. 1995, pp. 127–131.

* cited by examiner

Primary Examiner—Ahmad F. Matar
Assistant Examiner—Bing Bui
(74) Attorney, Agent, or Firm—Schiff Hardin & Waite

(57) ABSTRACT

In the routing method and apparatus a second routing attempt via an alternate path from an originating node is implemented for a call given an unsuccessful routing attempt via a preferred route, i.e. the call is offered a further alternate path to the destination node. The evaluation of the effectiveness of the rerouting is updated at each call per traffic relationship (originating/destination node pair), using an evaluation storing device. A decision is made based on the evaluation as to whether the rerouting for this traffic relationship is to be maintained or throttled for following calls.

2 Claims, 6 Drawing Sheets

ROUTING METHOD

BACKGROUND OF THE INVENTION

When a transient switching center does not find a free line in a connection setup (for example, as a result of an occupied route), then the preceding switching center can be informed of this upon collaboration of a corresponding backward signaling. When the original connection is set up again in the preceding switching center via a different route, then this method is referred to as "rerouting" or "crankback".

Under normal load conditions, the probability that a connection can be successively set up through the network is enhanced with this rerouting method. Under high load conditions, however, the rerouting method leads to higher network blockings than given a connection set up without rerouting methods. At the same time, the rerouting generates an additional blind load under high load, which leads to a further worsening of the load situation in the network.

Up to now, this problem was solved in that the operator manually disconnects in this high-load cases.

This procedure has the following disadvantages:

A plurality of measured traffic data would have to be acquired.

This would not be practical without an involved and expensive traffic management center.

Manual interventions are susceptible to error.

The rerouting would have to be designationally shut off for the respectively affected traffic relationships, which is not practical manually in large networks because of the great plurality of traffic relationships.

SUMMARY OF THE INVENTION

The present invention is based on the object of avoiding the above described disadvantages.

In general terms the present invention is a routing method. A second routing attempt via an alternate path from an originating node is implemented for a call given an unsuccessful routing attempt via a preferred route, i.e. the call is offered a further alternate path to the destination node. The evaluation of the effectiveness of the rerouting is updated at each call per traffic relationship (originating/destination node pair), using an evaluation storing means. A decision is made on the basis of the evaluation as to whether the rerouting for this traffic relationship is to be maintained or throttled for following calls.

Advantageous developments of the present invention are as follows.

Effectiveness of the rerouting is evaluated in that a respective rerouting account is maintained as evaluation storing means per traffic relationship (originating/ destination node pair). Given a successful routing of a call via an initially offered alternate route, the status of the account allocated to the traffic relationship of this call is incremented by a first amount. Given a rerouting required for a call, the status of the account allocated to the traffic relationship of this call is deincremented by a second amount. The rerouting is throttled fro a specific traffic relationship when the status of the account belonging to this traffic relationship falls below a specific threshold.

The present invention is also a rerouting system of a switching node in a communication network.

A rerouting means that, following an unsuccessful routing attempt of a call via a preferred route, a second routing attempt via an alternate path is implemented fro this call via an alternate path. A rerouting monitoring means that maintains an evaluation storing means per traffic relationship (originating/destination node pair) using the evaluation of the effectiveness of the rerouting is updated at each call, whereby the rerouting monitoring means decides on the basis of the updated evaluation as to whether the rerouting for this traffic relationship is to be maintained or throttled for following calls.

The rerouting monitoring means evaluates the effectiveness of the rerouting in that it maintains a respective rerouting account as evaluation storing means per traffic relationship (originating/destination node pair). The rerouting monitoring means, given a successful routing of a call via an initially offered alternate route, increments the status of the account allocated to the traffic relationship of this call by a first amount. The rerouting monitoring means, given a rerouting required for a call, deincrements the status of the account allocated to the traffic relationship of this call by a second amount. The rerouting monitoring means, throttles the rerouting for a specific traffic relationship when the status of the account belonging to this traffic relationship falls below specific threshold. The rerouting monitoring means throttles in that it temporarily suppresses the rerouting.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like element s and in which:

DESCRIPTION OF THE PREFERRED EMBODIMENTS

Figure 1:
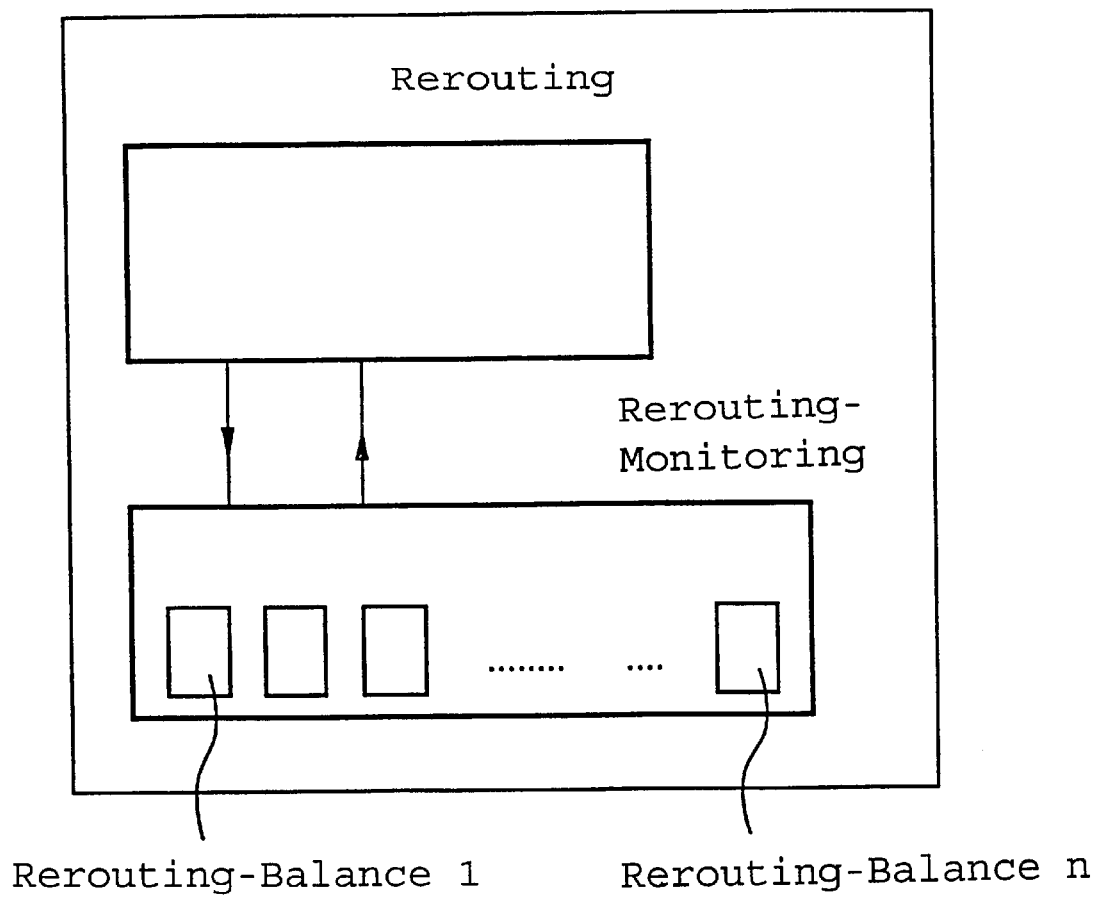
FIG. 1 depicts the structure of the routing system according to the present invention.

FIG. 1 shows the structure of the inventive routing system. The inventive system comprises a rerouting means as well as a rerouting monitoring means. The rerouting monitoring means maintains an evaluation memory means per traffic relationship (source-destination relationship), for example a bucket or an account (for example, a counter) with whose assistance an evaluation is made at every call to see whether the rerouting remains in force or is disconnected or, respectively, suppressed.

For every call successively routed via an alternate route, the bucket (or, respectively, the account status) is filled (or, respectively, incremented) by a specific quantity (or, respectively, specific amount G). The bucket (or, respectively, the account) exhibits an upper limit for the filling level (or, respectively, the account status) that is referred to below as maximum reading Cmax and that is independent of the traffic relationship.

On the other hand, the bucket or, respectively, the account is decremented by a specific amount S for every call for which a rerouting must be implemented. When the bucket is empty or, respectively, the reading falls below a specific threshold, the rerouting is suppressed for the next call or, respectively, the next calls of the same traffic relationship. The event that in turn ends the suppression of the rerouting for a traffic relationship can, for example, be the expiration of a specific time span. The end of the suppression is achieved by a renewed filling of the appertaining account (for example, to the initial value or to a value that lies just above the threshold).

The following data control the throttling of the rerouting:
Semi-Permanent Data of the System Program System:

Cmax: Maximum reading of the bucket, for example Cmax=40, patchable

G: Gain for every successfully routed call on an alternate route, for example G=1, patchable S: Loss for every rerouted call, for example S=2, patchable Transient Data Per Traffic Relationship:

nB: Non-negative integer that indicates the content of the bucket, initialization of the bucket: nB=0.75 Cmax.

Said exemplary values were selected on the basis of a simulation that concentrated on the investigation of overload situations and whose results are presented with the assistance of FIGS. 2 through 6.

In this simulation, an exemplary, symmetrical, fully interworked network with 23 nodes and 120 channels per link was investigated, namely under the following load conditions:

2 paths basic load=0.75 Erl/channel, concentrated overload offering of one node 1–22 to the node 23 (one path overload) of 0.375 Erl/channel up to 3 Erl/channel (in the example, the application of a dynamic routing method was assumed. However, the application of the inventive method is also possible and meaningful without limitation given non-dynamic routing (for example, "Fixed Alternate Routing")).

Figure 2:
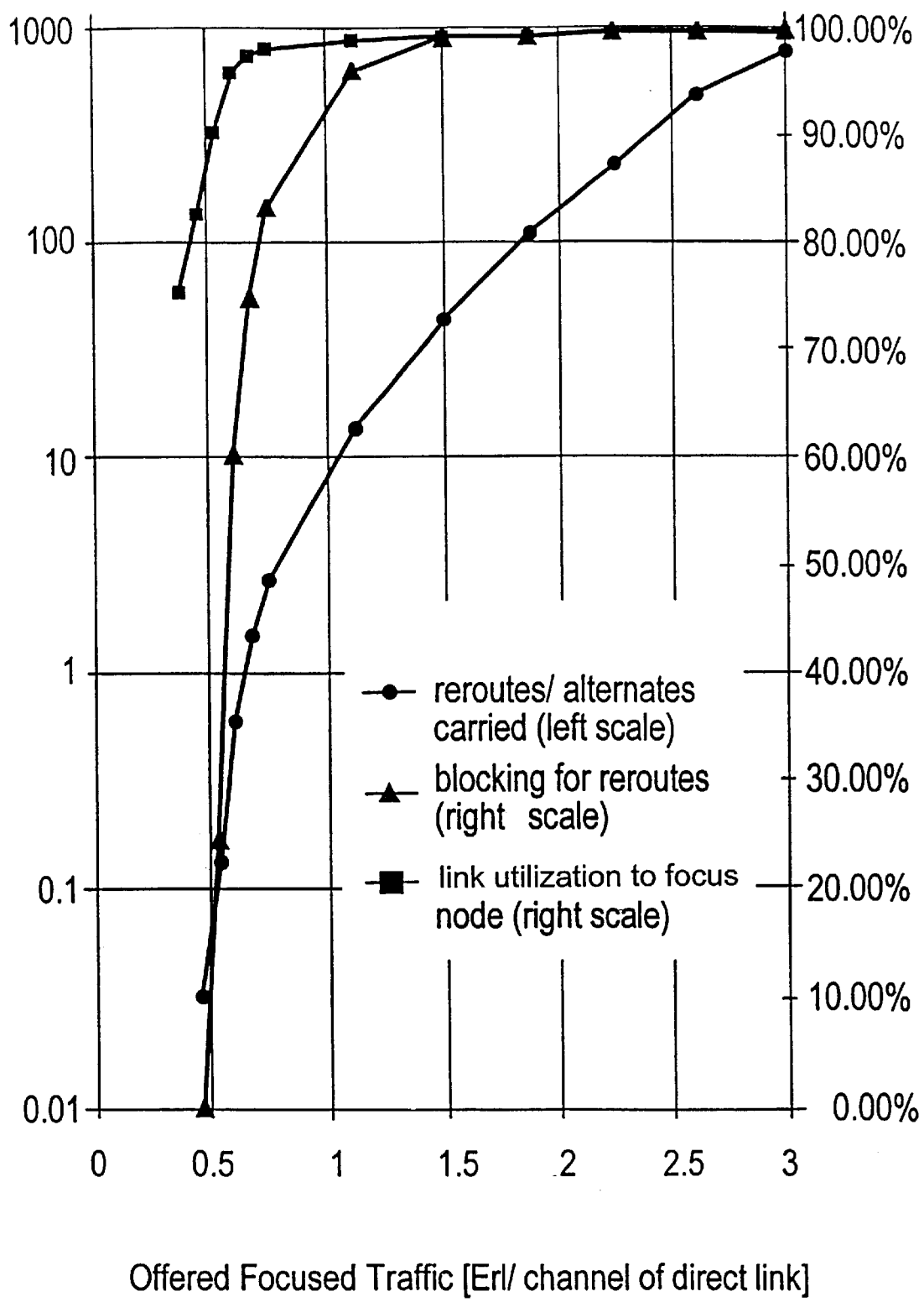
FIG. 2 is a graph depicting the link workload to a destination node.

FIG. 2 shows the result of said simulation for the quotient from the number of calls for which a rerouting was initiated and the number of calls that were successfully routed via alternate routes dependent on the offered overload (given deactivated throttling). In addition, FIG. 2 shows the link workload to the destination node 23 and the blocking probability for calls wherein rerouting ensued.

As soon as the links to the destination node start to go into saturation (85%–95%), the probability, accordingly, rapidly increases that a call for which rerouting ensued will be blocked, i.e. the rerouting becomes extremely inefficient. Parallel thereto, said quotient increases by two orders of magnitude. Said quotient is therefore a very sensitive parameter for investigating the effect of the inventive rerouting throttling mechanism.

As soon as said quotient reaches a value of approximately 0.6, the blocking probability for a call rerouted anew increases to more than 60%, and the link workload (link utilization) increases to 96%. G=1 and S=2 were selected as parameters in FIG. 1.

In order to check, on the one hand, that the routing performances is not influenced by the inventive throttling method and, on the other hand, that the network workload is reduced, the overload scenario of FIG. 2 was simulated with the inventive throttling mechanism and without the inventive throttling mechanism.

Figure 3:
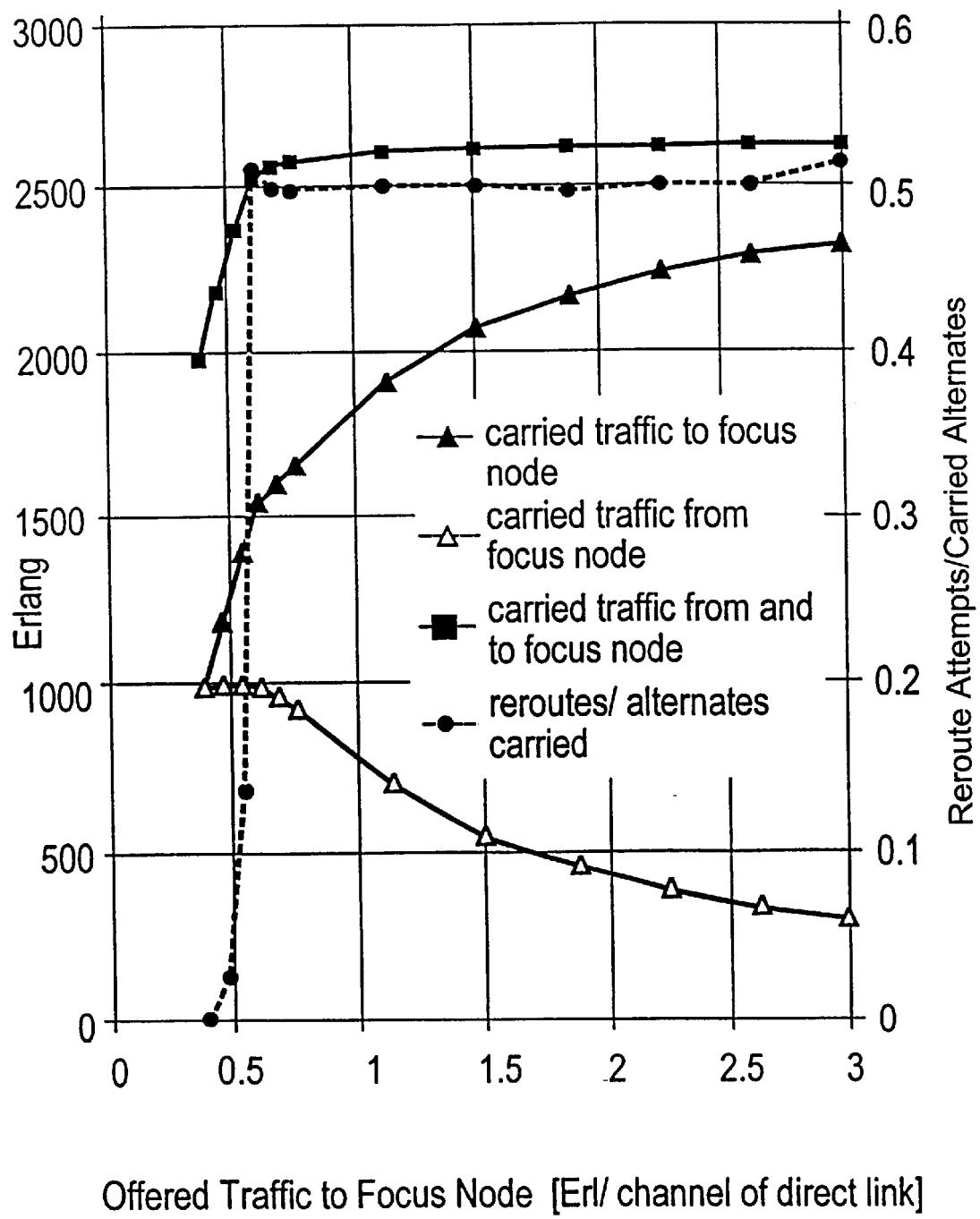
FIG. 3 is a graph depicting traffic to and from the destination node.

FIG. 3 shows the carried traffic to and from the destination node 23 for the case of rerouting with throttling mechanism. It can be seen from FIG. 3 that the throttling procedure is active when the channel resources to the destination node (22×120=2640 channels) are nearly used, i.e. the traffic to destination node 23 ensues only over alternate paths (substitute paths) nearly without exception. After this point, the carried traffic that terminates at the destination node deviates more and more from the carried traffic that arises in the destination node.

Figure 4:
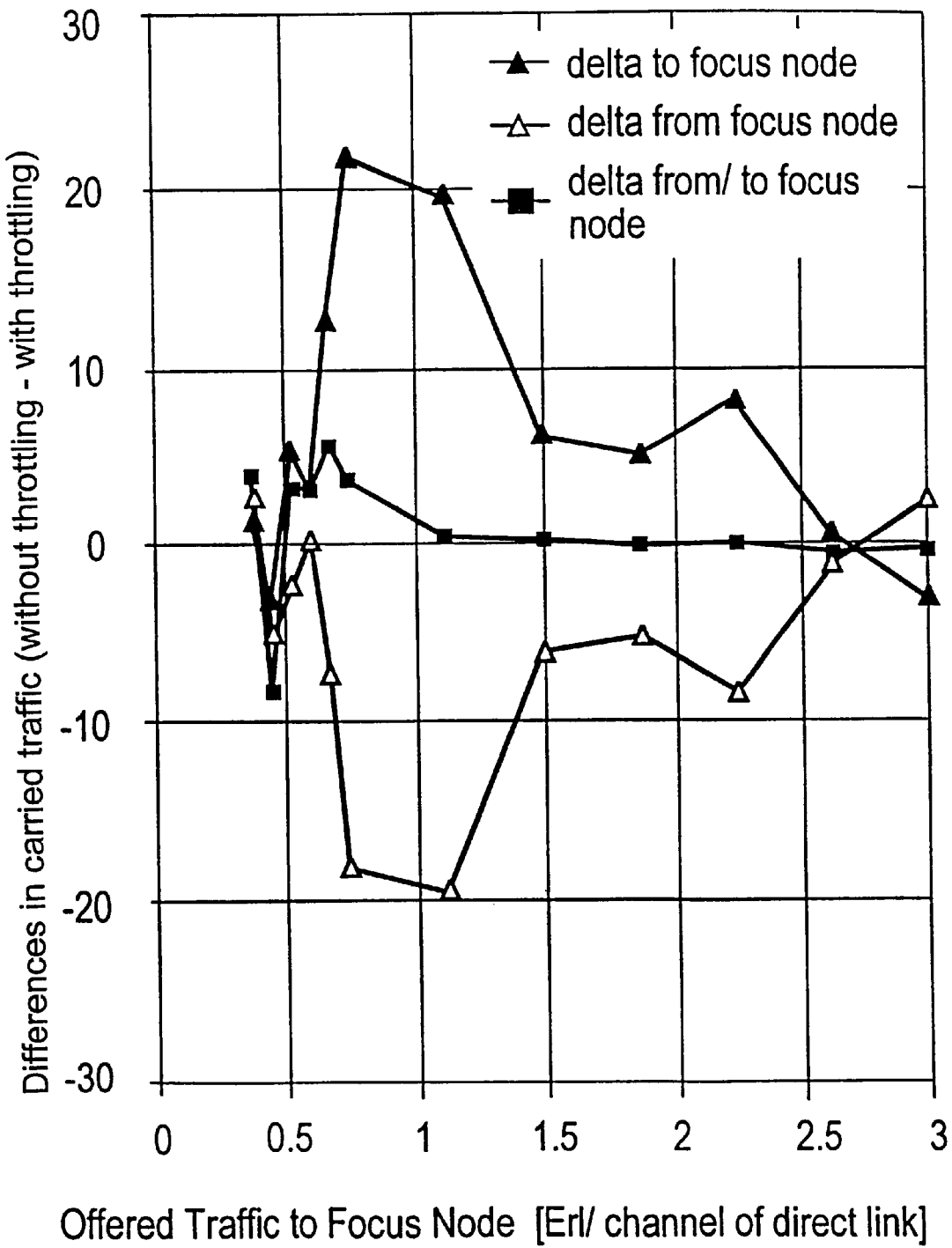
FIG. 4 is a graph depicting the differences in the traffic to the destination node.

Since differences (Deltas) compared to that case wherein the rerouting is not throttled would not be visible in FIG. 3 due to its orders of magnitude, these Deltas are shown in the carried traffic (Delta=non-throttled minus throttled) in FIG. 4.

FIG. 4 shows the Deltas in the carried traffic to the destination node 23 between the unthrottled and throttled case. Before the throttling exhibits any effect, the differences (Deltas) are of a purely statistical nature (different random spot checks (patterns) are used). When, however, the offered traffic becomes so high that the throttling of the rerouting becomes active, then the carried traffic to the destination node is reduced by less than 1 percent. This reduction is largely compensated by a gain in the carried traffic in the opposite direction. Overall, the reduction of the carried traffic from and to the destination node due to the throttling of the rerouting call attempts is thus negligible (less than 0.2%).

Figure 5:
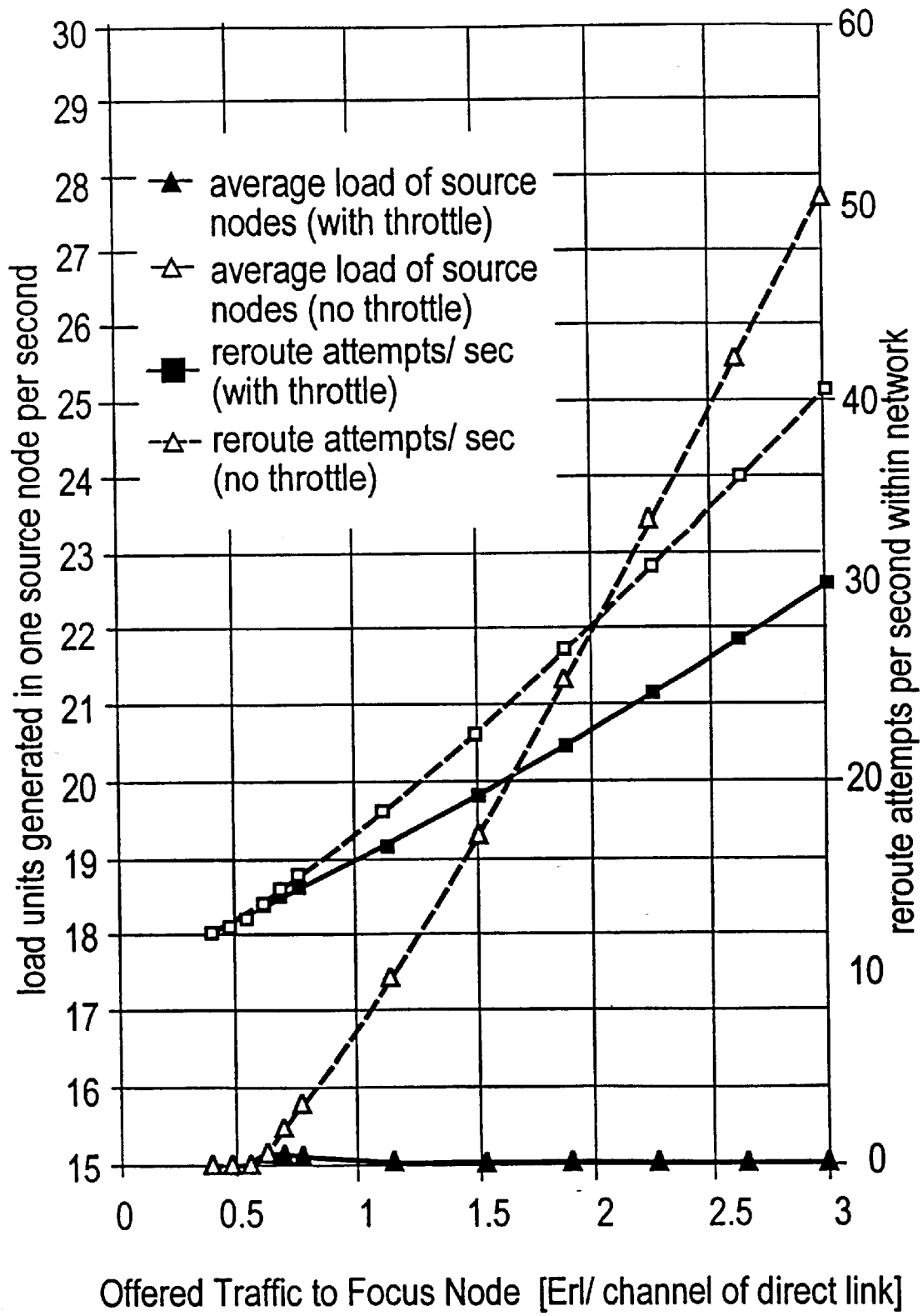
FIG. 5 is a graph depicting rerouting attempts.
Figure 6:
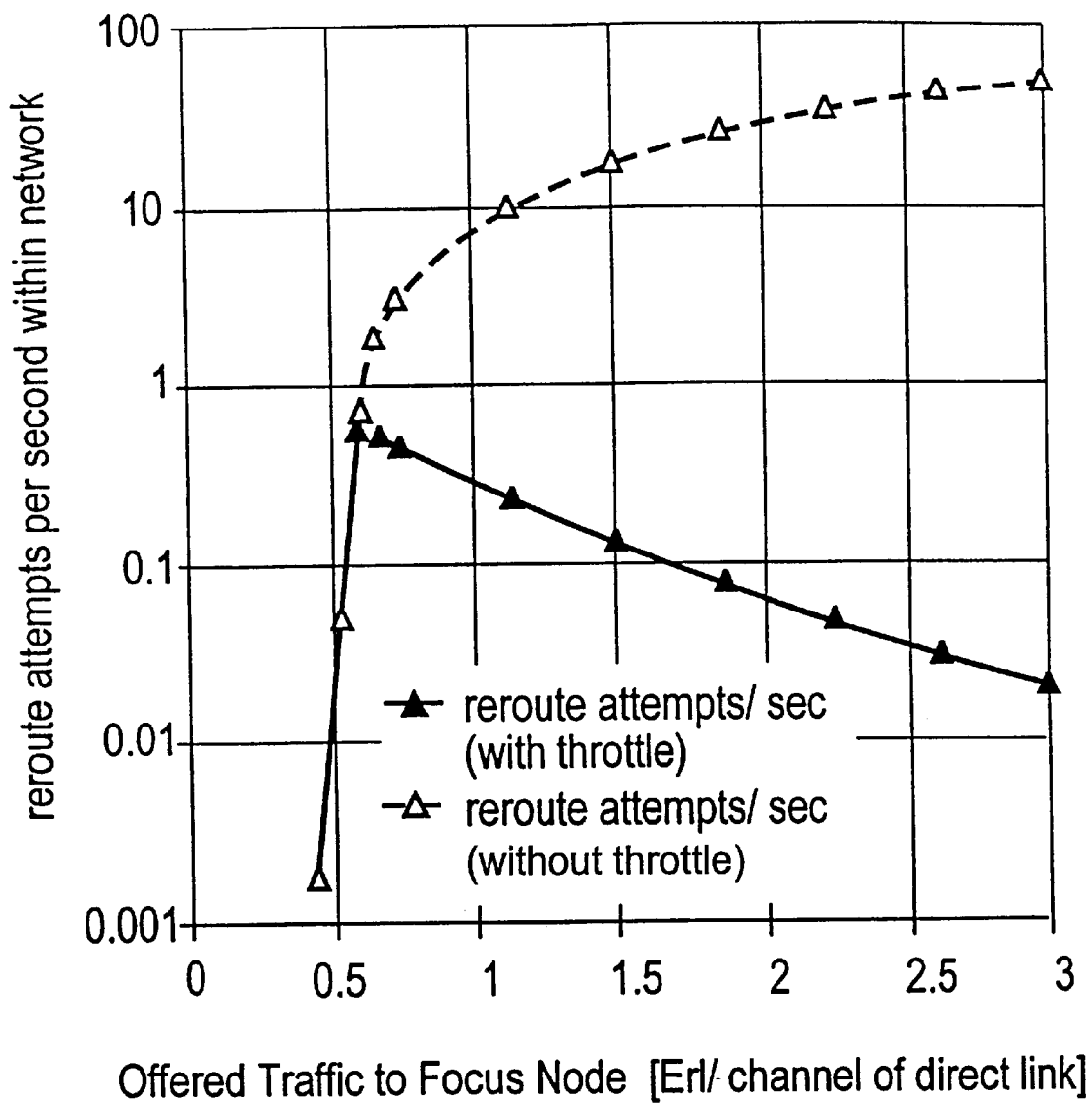
FIG. 6 is a graph depicting rerouting attempts with throttling.

FIG. 5 illustrates that without the throttling, the rerouting attempts start to flood the network as soon as the trunk resources are used up. These rerouting attempts thus contribute substantially to the call processing load generated overall within the network nodes. Since rerouting attempts mainly add to the load of the transient nodes, it can even occur that a limited network degradation (outage) leads to a network-wide overload. As can be seen from FIG. 5 and in a logarithmic scaling in FIG. 6, the throttling is extremely effective and, in the illustrated example, leads to a maximum rerouting attempt rate of less than one rerouting attempt per second within the network.

The maximum rate is thereby achieved at what is referred to as the throttling threshold point. When the offered traffic increases over and above this, said rate is rapidly reduced, by contrast whereto said rate increases in unlimited fashion with the offered traffic without the throttling.

The remaining increase in the processing load (see FIG. 5) is caused by the call processing in the originating node and in the transient node of the first alternative route that is sought. This increase (rise) could only be reduced if the alternate routing itself were to be throttled. This throttling of the alternate routing, however, is extremely problematical since, as a result thereof, effects negatively influencing the routing performance far more can occur than due to the throttling of the rerouting.

In summary, it can be stated that the results of the simulations that have been presented show that the disclosed, inventive throttling mechanism effectively protects the network against overload situations without negatively influencing the routing performance.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A routing method comprising the steps of:

causing an originating node to implement rerouting a call given an unsuccessful routing attempt via an alternate path first offered according to a direct path or a planned path;

maintaining a memory for evaluation of the rerouting per traffic relationship (originating/destination node pair);

incrementing by a first amount, the value of the memory allocated to the traffic relationship of the call given a successful routing of the call via an alternate path first offered;

deincrementing by a second amount, the value of the memory means allocated to the call given the rerouting required; and disconnecting or suppressing the rerouting for a specific traffic relationship when the value of the memory belonging to the traffic relationship falls below a specific threshold.

2. A routing system of a switching node in a communication network, the system comprising:

a rerouter that given an unsuccessful routing attempt made via an alternate first offered direct path route or planned path route, offers a call another alternate path;

a routing monitor; and a memory, such that a successful routing of a call via the alternate first offered path, increments a value in the memory allocated to a traffic relationship of the call by the first amount, and such that a rerouting required for the call the memory deincrements a value in the memory allocated to the call by a second amount, whereby the memory disconnects or suppresses rerouting for a specific traffic relationship when a value of memory belonging to the traffic relationship falls below a specific threshold.

* * * * *